United States Patent [19]

Hellström, Bengt

[11] Patent Number: 4,637,072
[45] Date of Patent: Jan. 13, 1987

[54] METHOD OF MEASURING THE DISPERSION OF A TRANSMITTING OPTICAL FIBRE

[75] Inventor: Bengt Hellström, Farsta, Sweden

[73] Assignee: Telefonaktiebolaget LM Ericsson, Stockholm, Sweden

[21] Appl. No.: 669,765

[22] Filed: Nov. 8, 1984

[51] Int. Cl.⁴ .................................................. H04B 9/00
[52] U.S. Cl. ........................................ 455/607; 324/96; 356/73.1; 455/612
[58] Field of Search ............... 455/610, 612, 617, 606, 455/607; 370/17, 74; 324/96; 250/227; 350/96.16; 356/73.1

[56] References Cited

U.S. PATENT DOCUMENTS

| | | | |
|---|---|---|---|
| 4,411,520 | 10/1983 | Mochizuki et al. | 356/73.1 |
| 4,435,850 | 3/1984 | Bowen et al. | 455/612 |
| 4,556,314 | 12/1985 | Stone | 356/73.1 |

FOREIGN PATENT DOCUMENTS

| | | | |
|---|---|---|---|
| 2534428 | 4/1984 | France | 455/612 |
| 2131247 | 6/1984 | United Kingdom | 455/612 |

OTHER PUBLICATIONS

Developments in Fibre Optics Within The Ericsson Group-Ericsson Review-No. 3-1980.
Eve et al-"Techniques for Measuring"-Poeej Stern-"Optic-Fibre Transmission Systems"-Poeej-vol. 71, Jan. 1979, pp. 239-246.
Cocito et al-"COS 2 Experiment"-CSELT Rapport Tecnici-vol. VI-No. Sep. 3, 1978, pp. 161-170.
Mogensen-"A Method in The Signal Processing-"-WO84/00613-Feb. 16, 1984.

*Primary Examiner*—Joseph A. Orsino, Jr.
*Attorney, Agent, or Firm*—Roberts, Spiecens & Cohen

[57] ABSTRACT

A method of measuring mode dispersion in a transmitting optical fibre for transferring light signals representing digital information coded according to a binary line code. The clock signal amplitude is first measured in the system receiver with the pertinent transmission fibre connected and thereafter with the system loop-connected. The dispersion can be calculated from both measured amplitude values.

3 Claims, 6 Drawing Figures

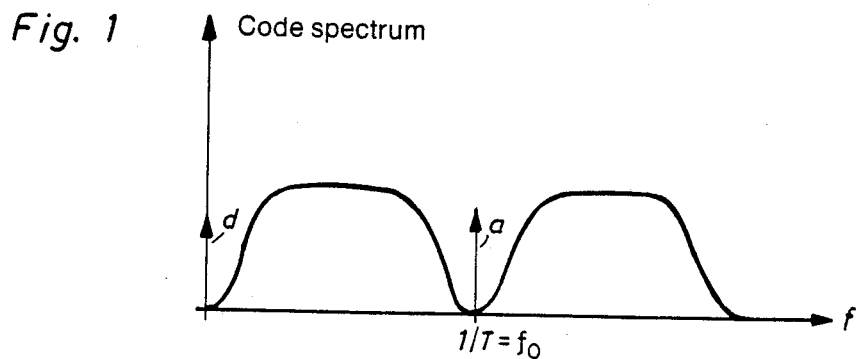
Fig. 1 Code spectrum
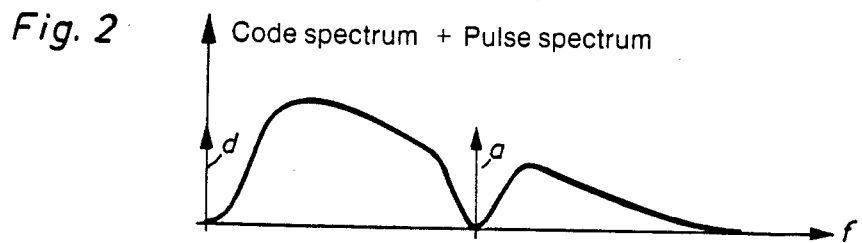
Fig. 2 Code spectrum + Pulse spectrum
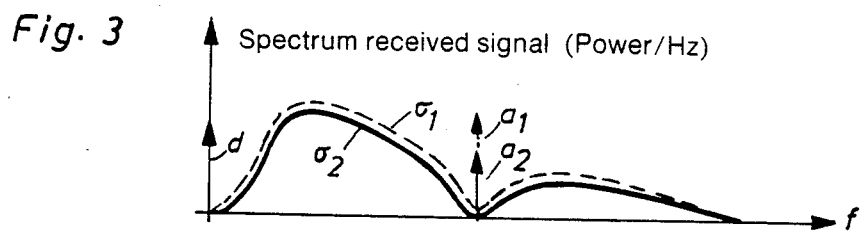
Fig. 3 Spectrum received signal (Power/Hz)
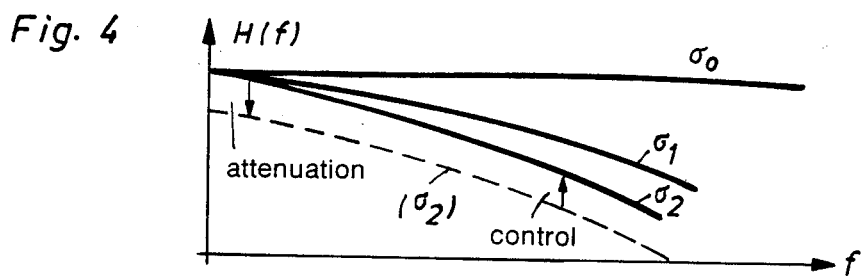
Fig. 4
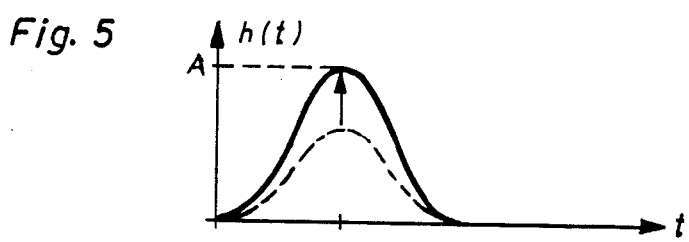
Fig. 5

METHOD OF MEASURING THE DISPERSION OF A TRANSMITTING OPTICAL FIBRE

TECHNICAL FIELD

The present invention relates to a method of measuring the dispersion of a transmitting optical fibre connected between two terminals in an optical fibre transmission system. Each terminal contains a transmitter and a receiver which respectively sends and receives digital information.

BACKGROUND ART

It is of importance to have knowledge of the transmission properties of fibres in the cables included in optical transmission systems. This primarily applies to the attenuation of the fibres and the widening, so-called dispersion, which occurs when transmitting the light pulses. The total dispersion is mainly composed of two components, material dispersion and mode dispersion. Of these components, mode dispersion gives rise to uncertainty for varying fibre length, since it cannot be accurately forecast theoretically, even if the value of the respective component of the dispersion is known for a given fibre length.

It is previously known, e.g. from Ericsson Review No. 3, 1980 "Transmission mesurements on fibre cables" to use a measuring object, i.e. a given length of the fibre desired to use as a transmission fibre. The fibre transmission function H(f) is determined by measuring input and output signals at certain equidistant points. By determining this function, the inpulse response can then be determined and thereby the dispersion. The method requires time-consuming measurements and expensive instruments, which are often not suitable for use in the field and often lack the necessary dynamics.

DISCLOSURE OF INVENTION

As mentioned above it is very difficult to obtain a definite measure of the dispersion of an optical fibre, since one cannot definitely forecast the value for an optional fibre length, even if the value is known for a given length. A method of circumventing this problem would be to carry out a measurement on the fibre when it is installed in its system. The problem here is to connect measuring means to the fibre end points and to carry out the measurements in field conditions.

The present method is intended for application to a digital optical fibre transmission system in which digital information is transferred with the aid of a binary line code, which has a frequency spectrum containing a discrete frequency component for the system clock frequency $f_0 = 1/T$. According to the inventive concept, the magnitude of this component is utilized to determine the fibre dispersion. By measuring the amplitude of the clock signal in the receiver, first with the pertinent transmission fibre connected up, and thereafter with the system loop connected ($L \approx 0$, $H(f)$ = constant) there is obtained a good estimation of the relative fibre attenuation at the clock frequency. Bandwidth and dispersion can then be calculated from these values.

An object of the present invention is thus to obtain a measure of the dispersion in an optical transmission fibre, which is coupled into or connected in an optical fibre transmission system, without using separate and complicated measuring equipment, by measuring directly in the system in which the fibre is included.

The method in accordance with the invention is characterized as is apparent from claim 1.

BRIEF DESCRIPTION OF THE DRAWINGS

The invention will now be described in detail with reference to the accompanying drawings, on which FIG. 1 is a diagram of the code spectrum for the code utilized in the system in which the method in accordance with the invention is applied, FIG. 2 illustrates the same spectrum in another part of the system, FIG. 3 illustrates the spectrum for a received signal in the system, FIG. 4 illustrates the transfer function of the transmission fibre, FIG. 5 illustrates the appearance of a received pulse and, FIG. 6 is a block diagram of the system in which the inventive method is applied.

BEST MODE FOR CARRYING OUT THE INVENTION

Figure 6:
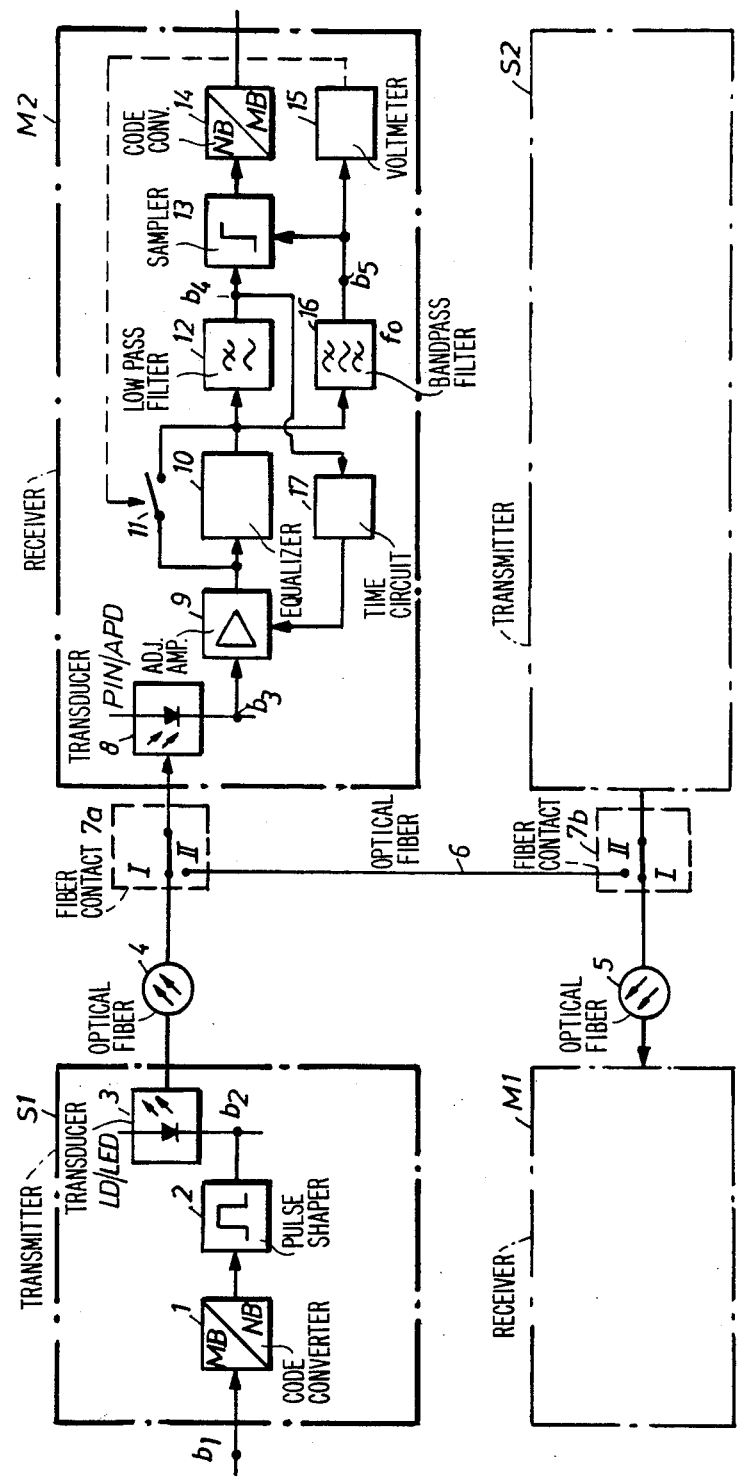

The method in accordance with the invention will now be first described briefly with reference to the diagrams according to FIGS. 1–5. The method is primarily intended to be applied to optical fibre transmission systems, which utilize a binary line code for transferring the digital information, the code spectrum of this code being apparent from FIG. 1. The clock frequency of the transmission system is $f_0$, and from FIG. 1 it will be seen that the code spectrum contains a discrete frequency component "a" at $f=f_0$. After pulse-shaping of the information-carrying binary signals, a composite spectrum is obtained according to FIG. 2.

The signal received after transmission through the optical fibre has a spectrum as illustrated in FIG. 3, if a code spectrum according to FIG. 1 is used. FIG. 3 illustrates two different cases in transmission through a fibre for two separate values of the dispersion: $\sigma_1$ and $\sigma_2$, where $\sigma_2 > \sigma_1$. The value $\sigma_1$ may correspond to a given length, for example, while the other value $\sigma_2$ corresponds to another fibre length. It will be seen from FIG. 3 that the discrete frequency component for the clock signal frequency assumes two different values $a_1$ and $a_2$ for the values $\sigma_1$ and $\sigma_2$ of the dispersion, i.e. the magnitude of the clock signal component is dependent on the dispersion. According to the method, the frequency component is therefore measured which corresponds to the clock signal on one of the system receiver sides, whereby a measure of dispersion of the transmitting fibre can be obtained. The measurement itself will be more fully described in connection with FIG. 6.

FIG. 4 illustrates the transfer function H(f) for an optical transmission fibre for three different values of the dispersion. The transfer function H(f) varies with the length and is generally of lowpass character with a bandwidth which decreases with increasing fibre length. The three graphs in full lines relate to transmission fibres with different dispersion values $\sigma_0$, $\sigma_1$ and $\sigma_2$, but with the same total attenuation. The graph with the value $\sigma_0$ represents a fibre with small length ($L \approx 0$). The graph drawn with a dashed line represents a fibre with the same value $\sigma_2$ as the corresponding one drawn with a full line, but with higher attenuation. The effect of the attenuation thus results in a displacement of the graphs drawn with full lines and gives rise to errors in the measurement if counter measures are not taken. To eliminate the error, an electronic regulation can be carried out in the receiver so that the received and detected signal is maintained at a constant level. This regulation will also compensate for the attenuation in the frequency component of the clock signal. FIG. 5 illustrates the principle in the time domain where the graph drawn with a dashed line represents the received signal attenuated and without regulation, while the graph with a full line represents the signal with level regulation in the receiver. Assuming a Gaussian impulse response for the fibre there is approximately obtained the following relationship between the dispersion $\sigma$ (half-value width in the fibre impulse response) and measured clock amplitude A:

$$\sigma = k \cdot \ln (A_O/A)$$

where $k=0.53T$, $A_O$=measured reference value and A=measured value in the pertinent case.

FIG. 6 is a block diagram of a system with transmission fibres utilizing the method of the invention. The system includes two terminals each having a transmitter unit S1, S2 and a receiver unit M1, M2. Optical fibres 4 and 5 are connected between the transmitters S1, S2 and receivers M1, M2, respectively. In order to loop-connect the system there are two optical fibre contacts 7a and 7b and a fibre 6, the contacts being in position I—I when the transmission fibres 4 and 5 are connected, but when the contacts 7a, 7b are in position II—II, the fibre 6 is connected between the transmitter S2 and its local receiver M2. The loop connection can also be arranged on the terminal side S1, M1.

The transmitter S1 includes a code converter 1, for converting an incoming digital information signal across the input $b_1$ according to a binary line code (c.f. the code spectrum in FIG. 1). After pulse-shaping in a pulse-shaping circuit 2, the signal is fed to an electro-optical converter or transducer 3, suitably consisting of a laser diode. Light signals corresponding to the electrical signals are taken through the transmission fibre 4 to an opto-electrical converter transducer 8 included in the receiver side M2.

The incoming light signal to the opto-electrical converter 8 will be converted, and a signal is delivered corresponding to the optical signal sent through the fibre 4. The signal across the output $b_3$ is amplified in an adjustable amplifier 9 and is taken further via the normally closed contact 11 to a lowpass filter 12 and also to a bandpass filter 16 with a center frequency $f_0$=the clock frequency. The incoming information signal is thus obtained lowpass-filtered at the point $b_4$, and is applied to a sampling circuit 13 before code conversion in the code converter 14. The bandpass-filtered signal across the output $b_5$ of the filter 16 is applied to the control input of the circuit 13, whereby this circuit is given necessary clock information for sampling.

The system clock signal which is available at point $b_5$ is utilized according to the inventive method to obtain an estimation of the dispersion of the fibre 4. At the point $b_5$ there is namely available the magnitude of the clock signal frequency component, which constitutes a measure of the dispersion according to the reasoning in connection with FIG. 3. For measuring the amplitude of the clock signal at point $b_5$ a volt meter 15 is therefore connected to the bandpass filter output. The amplitude of the sinusoidal clock signal filtered out in the bandpass filter 16 thus constitutes a measure of the dispersion in the transmitting fibre, c.f. above and FIG. 3.

To obtain a reference level for the measurement, a measurement of the clock signal amplitude is first made with the system loop-connected. For this purpose, the contacts 7a, 7b are switched to position II—II. The transmitter S2 is then connected in the terminal to its own receiver M2 via the fibre 6. This is so short in comparison with the transmission fibre 4 that its length may be regarded as equal to zero ($L \approx 0$) and the dispersion thus=0.

To eliminate the effect of the variation in the attenuation of the fibre 4, which is described above in connection with FIGS. 4 and 5, a feedback coupling containing the time circuit 17 is connected to the receiver M2. The feedback coupling is thus connected to the output of the lowpass filter 12 and to a control input on the amplifier 9. The output signal across the output $b_4$ is sensed and compared in the circuit 17 with a reference value, the difference giving a control signal to the amplifier 9, the gain of which is decreased or increased so that a constant output level is obtained.

An equalizer 10 is connected between the output of the amplifier 9 and the input to the lowpass filter 12 for equalizing the dispersion in the fibre 4. If the voltmeter 15 indicates a too high value, a control signal is sent conventionally through the dashed connection to the contact 11, which may be a transistor, this then being interrupted and the equalizer is coupled to the receiver.

The precise form of the fibre impulse response can vary somewhat with different fibres, which means that the calculation of bandwidth/dispersion cannot be absolutely exact. For longer fibre lengths, where the magnitude of the dispersion is most interesting, it has been found, however, that the impulse response is very nearly Gaussian (c.f. FIG. 5) and good accuracy can then be obtained.

I claim:

1. In an optical data transmission system having two terminals wherein a transmitter in a first terminal is connected by an optical fibre to a receiver of a second terminal and a transmitter in the second terminal is connected by another optical fibre to a receiver in the first terminal and data is transmitted between the terminals as light signals representing digital information coded according to a binary line code under control of a system clock signal of a given frequency, whereby the light signals have a frequency spectrum containing a discrete frequency component for the system clock frequency, the method of measuring the mode dispersion of at least one of the optical fibres comprising the steps of, during the transmission of light signals representing clocked digital information coded according to the binary code from the transmitter in the first terminal to the receiver in the second terminal, measuring the magnitude ($A_1$) of the discrete frequency component for the system clock signal in said light signals, transmitting other light signals representing clocked digital information coded according to the binary code from the transmitter in the second terminal to the receiver in the second terminal, during the transmission of said other light signals measuring the magnitude ($A_2$) of the discrete frequency component for the system clock signal in said other light signals, and utilizing the ratio of said magnitudes ($A_2$) and ($A_1$) to obtain the mode dispersion factor for at least the optical fibre connecting the transmitter in the first terminal to the receiver in the second terminal.

2. The method of claim 1 wherein the steps of measuring the magnitude of the discrete frequency component comprises transducing the light signals to electrical signals and band pass filtering the electrical signals, the band pass having a center frequency equal to the frequency of the clock signals.

3. The method of claim 1 further comprising the steps of compensating for any effect in the magnitude of the discrete frequency component due to light signal attenuation by the optical fibres.

* * * * *